(12) United States Patent
Takase et al.

(10) Patent No.: US 11,337,025 B2
(45) Date of Patent: May 17, 2022

(54) INFORMATION PROCESSING APPARATUS AND SOUND GENERATION METHOD

(71) Applicant: Sony Interactive Entertainment Inc., Tokyo (JP)

(72) Inventors: Masaki Takase, Tokyo (JP); Naoki Tokiwa, Tokyo (JP); Akira Miyashita, Tokyo (JP)

(73) Assignee: Sony Ineractive Entertainment Inc., Tokyo (JP)

( * ) Notice: Subject to any disclaimer, the term of this patent is extended or adjusted under 35 U.S.C. 154(b) by 0 days.

(21) Appl. No.: 17/058,314

(22) PCT Filed: May 23, 2019

(86) PCT No.: PCT/JP2019/020528
§ 371 (c)(1),
(2) Date: Nov. 24, 2020

(87) PCT Pub. No.: WO2019/230567
PCT Pub. Date: Dec. 5, 2019

(65) Prior Publication Data
US 2021/0211827 A1    Jul. 8, 2021

(30) Foreign Application Priority Data
May 30, 2018 (JP) .............................. JP2018-103966

(51) Int. Cl.
*H04S 7/00* (2006.01)
*G02B 27/01* (2006.01)

(52) U.S. Cl.
CPC .......... *H04S 7/304* (2013.01); *G02B 27/0176* (2013.01); *H04S 7/40* (2013.01);
(Continued)

(58) Field of Classification Search
CPC .. H04S 2420/01; H04S 2400/01; H04S 7/304; H04S 2400/11; H04S 7/40; G02B 27/0176
(Continued)

(56) References Cited

U.S. PATENT DOCUMENTS 7,433,479 B2  10/2008 Sato
9,628,896 B2   4/2017 Ichimura
(Continued)

FOREIGN PATENT DOCUMENTS

JP    2004201194 A    7/2004
JP    2008245984 A   10/2008
(Continued)

OTHER PUBLICATIONS

International Search Report for corresponding PCT Application No. PCT/JP2019/020528, 4 pages, dated Jun. 25, 2019.
(Continued)

*Primary Examiner* — Paul Kim
(74) *Attorney, Agent, or Firm* — Matthew B. Dernier, Esq.

(57) ABSTRACT

A game sound localization processing section localizes the sound image of a game sound. A game sound output section supplies localized game sound data to speakers. An agent sound localization processing section localizes the sound image of an agent sound at a second localization position that is different from a first localization position where the sound image of the game sound is localized. An agent sound output section supplies localized agent sound data to the speakers.

8 Claims, 10 Drawing Sheets

(52) U.S. Cl.
CPC ....... *H04S 2400/01* (2013.01); *H04S 2400/11* (2013.01); *H04S 2420/01* (2013.01)

(58) Field of Classification Search
USPC ........................................................ 381/310
See application file for complete search history.

(56) References Cited

U.S. PATENT DOCUMENTS

| | | | |
|---|---|---|---|
| 9,628,931 B2 | 4/2017 | Ebato | |
| 9,898,863 B2 | 2/2018 | Miyazawa | |
| 2005/0117761 A1 | 6/2005 | Sato | |
| 2011/0096939 A1 | 4/2011 | Ichimura | |
| 2014/0300636 A1* | 10/2014 | Miyazaya | H04S 7/304 345/633 |
| 2015/0281867 A1* | 10/2015 | Enamito | H04S 1/005 381/310 |
| 2018/0341982 A1 | 11/2018 | Goto | |

FOREIGN PATENT DOCUMENTS

| | | |
|---|---|---|
| JP | 2011097268 A | 5/2011 |
| JP | 2013162285 A | 8/2013 |
| JP | 2015127900 A | 7/2015 |
| JP | 2015198297 A | 11/2015 |
| JP | 2017103598 A | 6/2017 |
| JP | 2017184174 A | 10/2017 |
| WO | 2018079850 A1 | 5/2018 |

OTHER PUBLICATIONS

International Preliminary Report on Patentability and Written Opinion corresponding PCT Application No. PCT/JP2019/020528, 16 pages, dated Dec. 10, 2020.

* cited by examiner

INFORMATION PROCESSING APPARATUS AND SOUND GENERATION METHOD

TECHNICAL FIELD

The present invention relates to a technology for localizing a sound image in a space.

BACKGROUND ART

A technology disclosed in PTL 1 uses a sound image localization technology for spatially disposing voice information so as to let a user have a sense as if a virtual character actually exists in a real space, to present guidance information including the voice of the virtual character for guiding the user to a predetermined place, and to thus motivate the user to follow the guidance information.

CITATION LIST

Patent Literature

[PTL 1] Japanese Patent Laid-open No. 2017-103598

SUMMARY

Technical Problem

A surround sound space where speakers are disposed so as to surround a user provides the user with a spread sound field and the stereophonic and realistic sense of sound. While 5.1-channel and 7.1-channel sound systems are in widespread use, sound systems developed in recent years are configured such that speakers are mounted, for example, on a ceiling to emit a sound from above in order to improve a stereophonic effect produced in a three-dimensional sound space. Further, a virtual surround technology has conventionally existed to provide a virtual multi-channel sound space by using a small number of speakers. The virtual surround technology reproduces a surround sound in a pseudo manner by localizing the sound image of a virtual sound source.

For example, when a video, such as a movie, is reproduced, the stereophonic and realistic sense of sound is enhanced by properly localizing the sound of the movie in a surround sound space. Similarly, in the field of gaming, a sound emitted from a virtual object in a game is localized in the surround sound space. Meanwhile, for example, a notification sound outputted from a system to a user playing a game is merely outputted at a uniform volume from a plurality of speakers and can still be improved.

An object of the present invention is to provide a technology that makes effective use of the sound image localization technology.

Solution to Problem

In order to solve the above problem, according to an aspect of the present invention, there is provided an information processing apparatus that is to be connected to a plurality of speakers. The information processing apparatus includes a first localization processing section, a first sound output section, a second localization processing section, and a second sound output section. The first localization processing section localizes a sound image of a sound of content. The first sound output section supplies, to the speakers, sound data of the content subjected to localization. The second localization processing section localizes a sound image of a sound different from the sound of the content at a second localization position. The second localization position is different from a first localization position where the sound image of the sound of the content is localized. The second sound output section supplies, to the speakers, data of the sound different from the sound of the content subjected to localization.

The content is, for example, a game, and a content sound may be a game sound that is generated during a game. The sound different from the content sound is a sound that is generated by system software or application different from the content. When the content sound is a game sound, the sound different from the content sound may be a sound generated by an application different from the game or a sound generated by system software. Note that the content sound may also be a sound reproduced by an application other than a game, such as a video reproduction application. The originator of a sound may be personified and visually presented to a user or may not be personified.

According to another aspect of the present invention, there is provided a sound generation method. The sound generation method includes the steps of localizing a sound image of a sound of content, supplying, to speakers, sound data of the content subjected to localization, localizing a sound image of a sound different from the sound of the content at a second localization position that is different from a first localization position where the sound image of the sound of the content is localized, and supplying, to the speakers, data of the sound different from the sound of the content subjected to localization.

Any combinations of the abovementioned elements and any conversions of expressions of the present invention between, for example, methods, apparatuses, systems, computer programs, recording media storing readable computer programs, and data structures are also effective as the aspects of the present invention.

DESCRIPTION OF EMBODIMENTS

Figure 1:
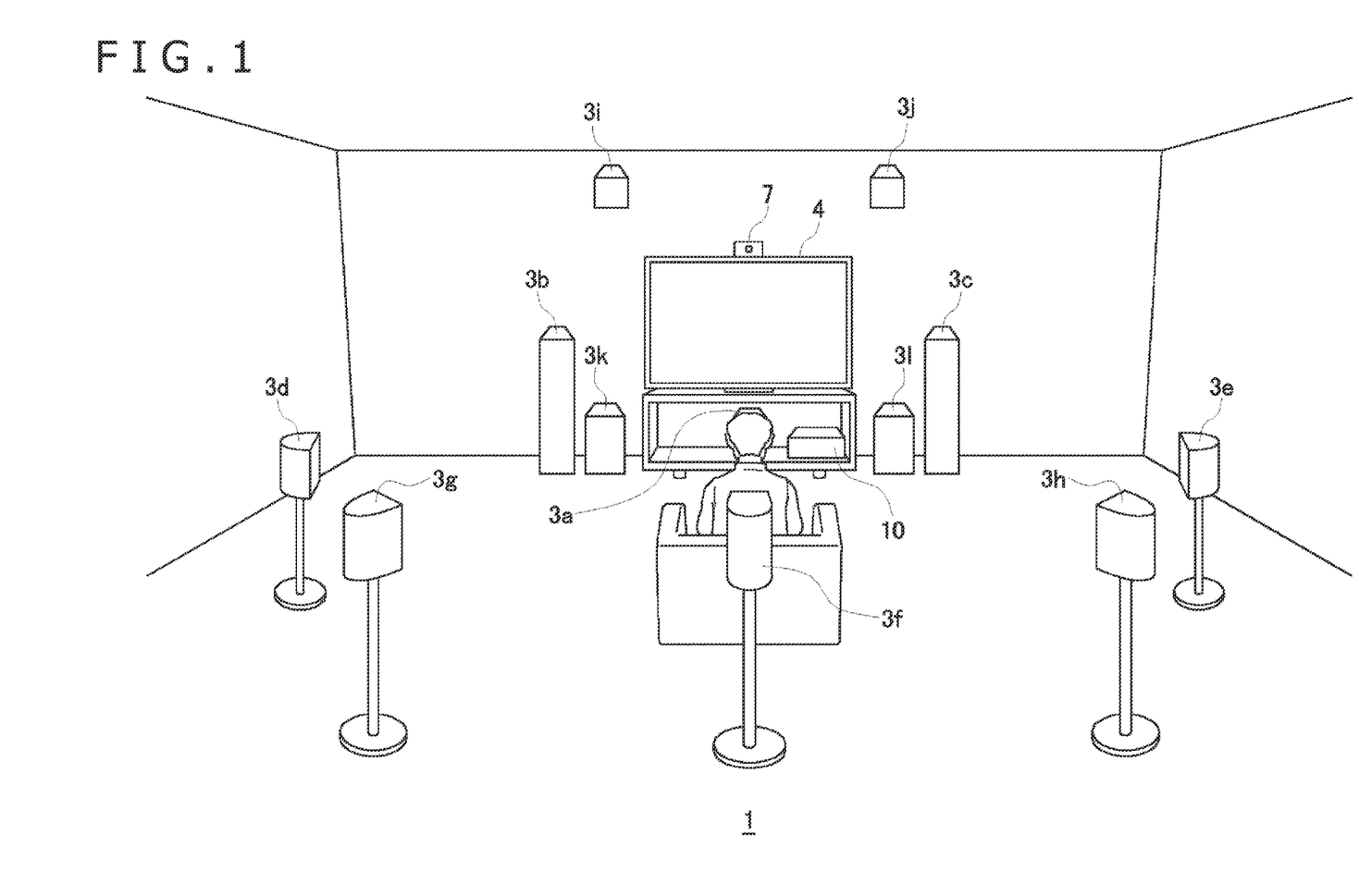
FIG. 1 is a diagram illustrating an example of a surround sound space of a user.

FIG. 1 illustrates an example of a surround sound space of a user playing a game. An information processing system 1 includes an information processing apparatus 10, a plurality of speakers 3a to 3j (hereinafter simply referred to as the "speakers 3" when they are not particularly distinguished from each other), a display apparatus 4, and a camera 7. The information processing apparatus 10 is a user terminal apparatus. The speakers 3 provide a multi-channel sound space. The display apparatus 4 may, for example, be a TV set. The camera 7 captures an image of a front space of the display apparatus 4. The camera 7 may be a stereo camera. The information processing apparatus 10 is to be connected to the speakers 3, the display apparatus 4, and the camera 7.

In an embodiment, the information processing apparatus 10 is a gaming apparatus for executing a game program and is connected, in a wireless or wired manner, to a game controller (not depicted) operated by the user so that operation information supplied from the game controller is reflected in game processing. The information processing apparatus 10 supplies game images to the display apparatus 4 and supplies game sounds to the speakers 3. In an embodiment, the information processing apparatus 10 has a function for executing the game program. In a modified embodiment, the information processing apparatus 10 may not have the function for executing the game program but may be used as a terminal apparatus that transmits operation information inputted to the game controller to a cloud server and receives the game images and sounds from the cloud server.

The user sits in front of the display apparatus 4 that displays the game images and plays the game. The information processing apparatus 10 acquires a user image captured by the camera 7 and identifies the location of the user in a room. A center speaker 3a is disposed in front of the user. Front speakers 3b and 3c and subwoofers 3k and 3l are disposed on the front left and right of the user in such a manner as to sandwich the display apparatus 4. The subwoofers reproduce sounds with very low bass frequencies. Surround speakers 3d and 3e are disposed on the left and right sides of the user. A surround back speaker 3f is disposed directly behind the user. Surround back speakers 3g and 3h are disposed left and right behind the user. Further, height speakers 3i and 3j are mounted on a ceiling.

The surround sound space according to an embodiment is capable of achieving highly accurate three-dimensional sound image localization when the height speakers 3i and 3j are positioned higher than the other speakers. The surround sound space depicted in FIG. 1 is an example of a game play environment for the user; in order to permit the information processing apparatus 10 to localize the sound image of, for example, a game sound at a desired position in a room space, it is necessary to grasp the positions and orientations of the speakers 3 in the room.

In an embodiment, it is assumed that the surround sound space is constructed by disposing plural speakers 3 around the user. However, a virtual surround technology has conventionally existed to provide a virtual multi-channel sound space by using a small number of speakers, typically, two speakers. When a virtual surround sound space is to be constructed, the information processing apparatus 10 localizes the sound image of a virtual sound source by using a head-related transfer function (HRTF) based, for example, on the direction of the sound image.

Figure 2:
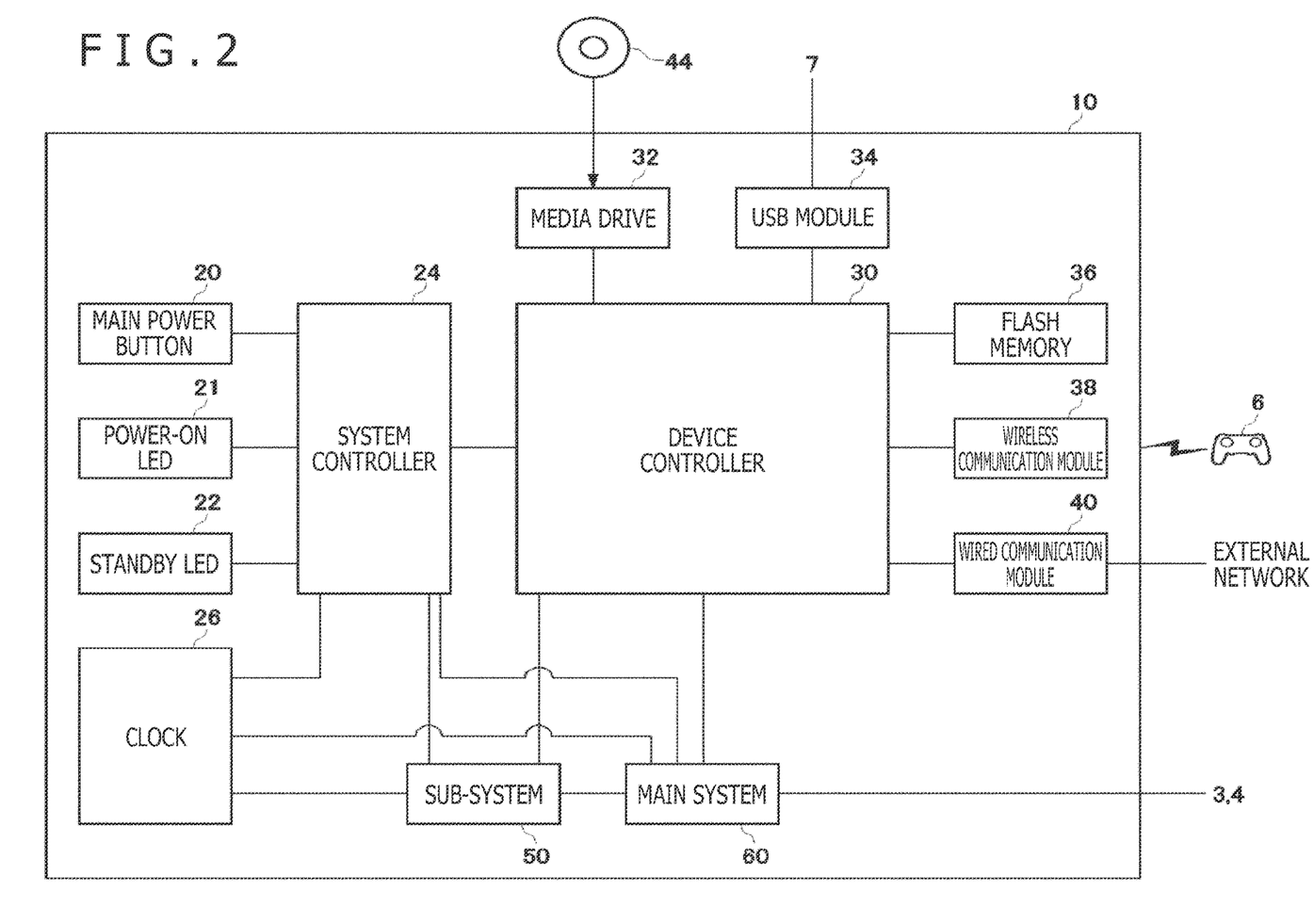
FIG. 2 is a diagram illustrating a hardware configuration of an information processing apparatus.

FIG. 2 illustrates a hardware configuration of the information processing apparatus 10. The information processing apparatus 10 includes a main power button 20, a power-ON light emitting diode (LED) 21, a standby LED 22, a system controller 24, a clock 26, a device controller 30, a media drive 32, a universal serial bus (USB) module 34, a flash memory 36, a wireless communication module 38, a wired communication module 40, a sub-system 50, and a main system 60.

The main system 60 includes, for example, a main CPU (Central Processing Unit), a memory, a memory controller, and a graphics processing unit (GPU). The memory functions as a main storage. The GPU is mainly used for arithmetic processing of the game program. These functions may be configured as a system-on-chip and formed on a single chip. The main CPU is capable of executing the game program recorded in an auxiliary storage (not depicted) or a read only memory (ROM) medium 44.

The sub-system 50 includes, for example, a sub-CPU, a memory, and a memory controller. The memory functions as a main storage. The sub-system 50 does not include a GPU and is incapable of executing the game program. The sub-CPU has a smaller number of circuit gates than the main CPU and consumes a smaller amount of power than the main CPU. The sub-CPU operates even while the main CPU is in a standby state. The processing function of the sub-CPU is limited in order to reduce power consumption.

The main power button 20 is an input section that is used by the user for operation input purposes. The main power button 20 is mounted on the front surface of a housing for the information processing apparatus 10 and operated in order to turn on or off the power supply to the main system 60 of the information processing apparatus 10. The power-ON LED 21 illuminates when the main power button 20 is turned on. The standby LED 22 illuminates when the main power button 20 is turned off.

The system controller 24 detects whether the main power button 20 is pressed by the user. When the main power button 20 is pressed while the main power is off, the system controller 24 acquires such a button press as an "ON instruction." Meanwhile, when the main power button 20 is pressed while the main power is on, the system controller 24 acquires such a button press as an "OFF instruction."

The clock 26, which is a real-time clock, generates current date and time information and supplies it to the system controller 24, the sub-system 50, and the main system 60. The device controller 30 is configured as an large-scale integrated circuit (LSI) that exchanges information between devices like a southbridge. As depicted in FIG. 2, the device controller 30 is connected to various devices, such as the system controller 24, the media drive 32, the USB module 34, the flash memory 36, wireless communication module 38, the wired communication module 40, the sub-system 50, and the main system 60. The device controller 30 absorbs the difference between the devices in electrical characteristics and data transfer rate and controls the timing of data transfer.

The media drive 32 is a drive apparatus for driving the ROM medium 44 that records application software, such as a game, and license information and that is inserted into the media drive 32 and for reading out programs and data from the ROM medium 44. The ROM medium 44 may be a read-only recording medium such as an optical disc, a magneto-optical disc, or a Blu-ray disc.

The USB module 34 is a module for connecting to external equipment with a USB cable. The USB module 34 may be connected to an external auxiliary storage and the camera 7 with a USB cable. The flash memory 36 is an auxiliary storage that constitutes an internal storage. The wireless communication module 38 establishes wireless communication, for example, with a game controller 6 in accordance with a communication protocol, such as the Bluetooth (registered trademark) protocol or the IEEE 802.11 protocol. The wired communication module 40 establishes wired communication with external equipment and connects to an external network, such as the Internet, through an access point.

Figure 3:
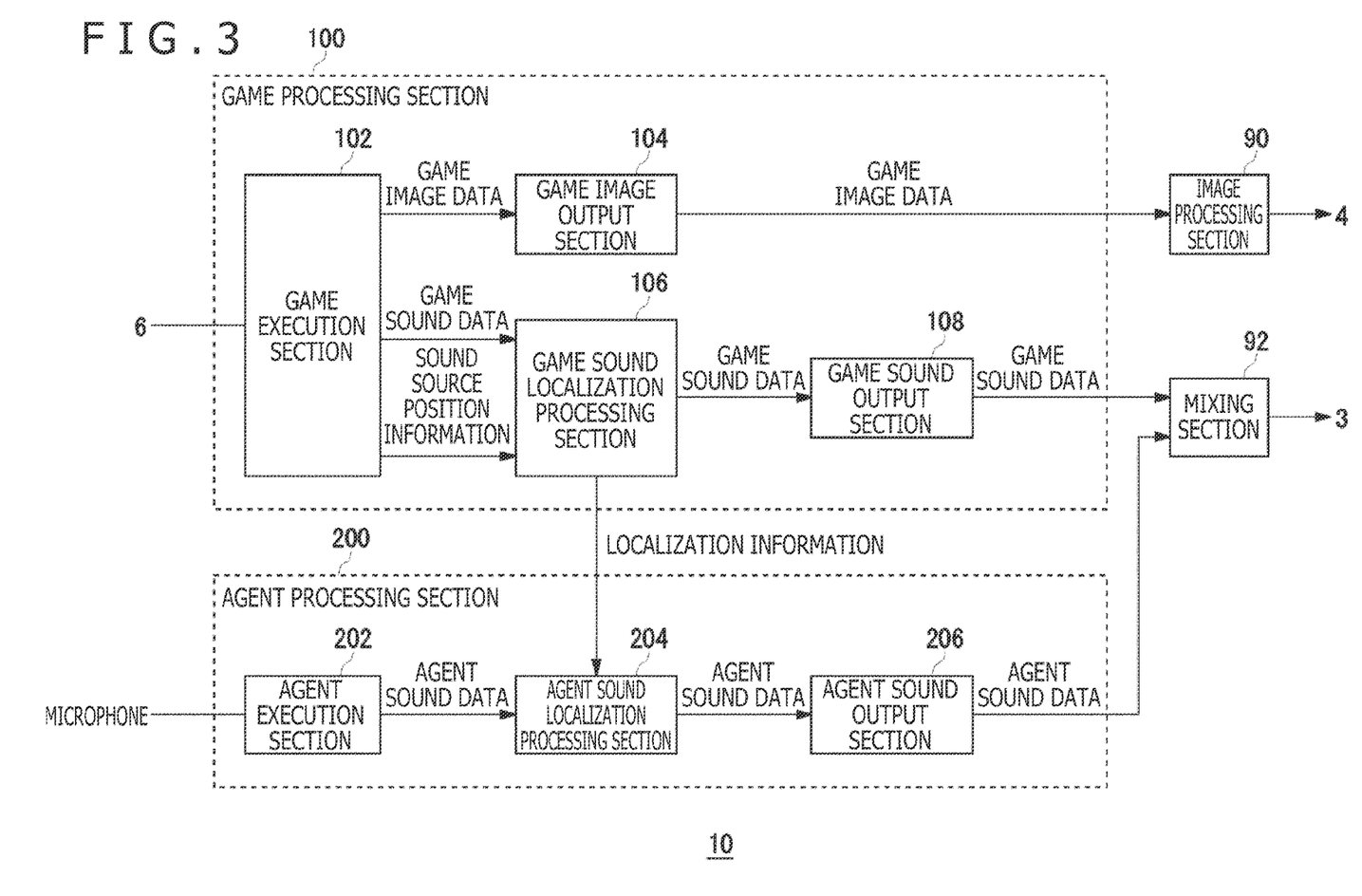
FIG. 3 is a diagram illustrating the functional blocks of the information processing apparatus according to a first embodiment.

FIG. 3 illustrates the functional blocks of the information processing apparatus 10 according to a first embodiment. In the first embodiment, the information processing apparatus 10 responds to a user's utterance and executes an agent function for supplying recommended information to the user. An agent may be in the form of a visually personified character so that the character appears on the display apparatus 4 when the agent communicates with the user. Alternatively, the agent may communicate with the user by using only a voice without being visually personified.

The information processing apparatus 10 includes a game processing section 100, an agent processing section 200, an image processing section 90, and a mixing section 92. The game processing section 100 includes a game execution section 102, a game image output section 104, a game sound localization processing section 106, and a game sound output section 108. The agent processing section 200 includes an agent execution section 202, an agent sound localization processing section 204, and an agent sound output section 206.

Referring to FIG. 3, individual elements depicted as the functional blocks for performing various processes may be implemented by hardware such as a circuit block, a memory, or other LSI, or by software such as system software or a game program loaded into the memory. Therefore, it will be understood by those skilled in the art that the functional blocks may variously be implemented by hardware only, by software only, or by a combination of hardware and software. The method of implementing the functional blocks is not specifically limited.

The game execution section 102 executes the game program (hereinafter simply referred to as the "game" in some cases) to generate game image data and sound data. Functions exercised by the game execution section 102 are implemented by the system software, the game program, or hardware such as the GPU for performing a rendering process. The game is an example of application. Thus, the game execution section 102 may execute an application other than the game.

Based on the operation information inputted to the game controller 6 by the user, the game execution section 102 performs arithmetic processing for moving a game character in a virtual space. On the basis of the result of arithmetic processing on the virtual space, the game execution section 102 generates game image data as viewed from the point of view (virtual camera) in the virtual space. Further, the game execution section 102 generates game sound data in the virtual space.

For example, in a first-person shooter (FPS) game, the game execution section 102 generates image data as viewed from the point of view of a game character (first person) operated by the user and supplies the generated image data to the game image output section 104. The game image output section 104 causes the entire display area of the display apparatus 4 to display the game image data.

Figure 4:
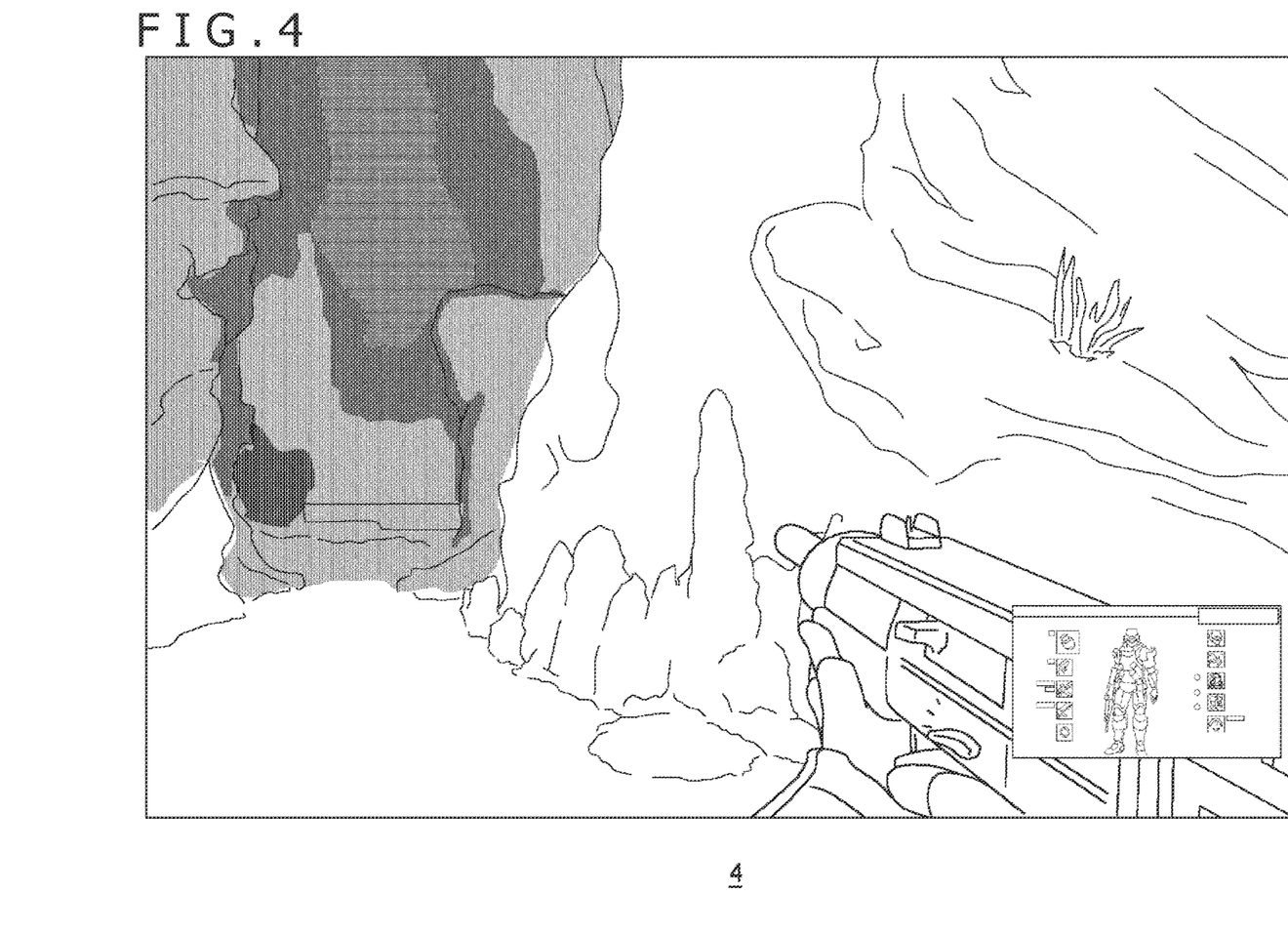
FIG. 4 is a diagram illustrating an example of a game image.

FIG. 4 illustrates an example of the game image displayed on the display apparatus 4. The game image output section 104 supplies the game image data to the image processing section 90. The image processing section 90 generates display data from the game image data and displays the game image in the entire display area of the display apparatus 4.

The game execution section 102 generates the game sound data to be generated from a sound generation source in the game space and supplies the generated game sound data to the game sound localization processing section 106. In this instance, the game execution section 102 also supplies sound source position information to the game sound localization processing section 106. The sound source position information is used by the game sound localization processing section 106 to calculate information indicating the relative direction and distance of the sound generation source with respect to the game character. The sound source position information may include, for example, the position information regarding and the direction (orientation) of the game character in a world coordinate system of a game space and the position information regarding the sound generation source. The game sound localization processing section 106 calculates, from the sound source position information, the relative direction and distance of the sound generation source with respect to the game character and determines a position in a three-dimensional space at which the sound image of a game sound is to be localized.

Let us assume a case where an explosion sound is generated at a location in the game space that is positioned at a distance L from the game character and oriented leftward at an angle α from the forward direction of the game character. The game execution section 102 generates the sound source position information including the position information regarding and the direction (orientation) of the game character in the world coordinate system of the game space as well as the position information regarding the sound generation source and supplies the generated sound source position information to the game sound localization processing section 106. Alternatively, the game execution section 102 may generate the sound source position information indicating that the sound source is positioned on the left front side of and at the distance L from the game character and oriented at the angle α from the game character and supply the generated sound source position information to the game sound localization processing section 106. The game sound localization processing section 106 determines a localization position P1 for the sound image of the game sound by converting the relative direction and distance relation between the game character and the sound generation source to a direction and distance relation with respect to the user in the three-dimensional space.

Figure 5:
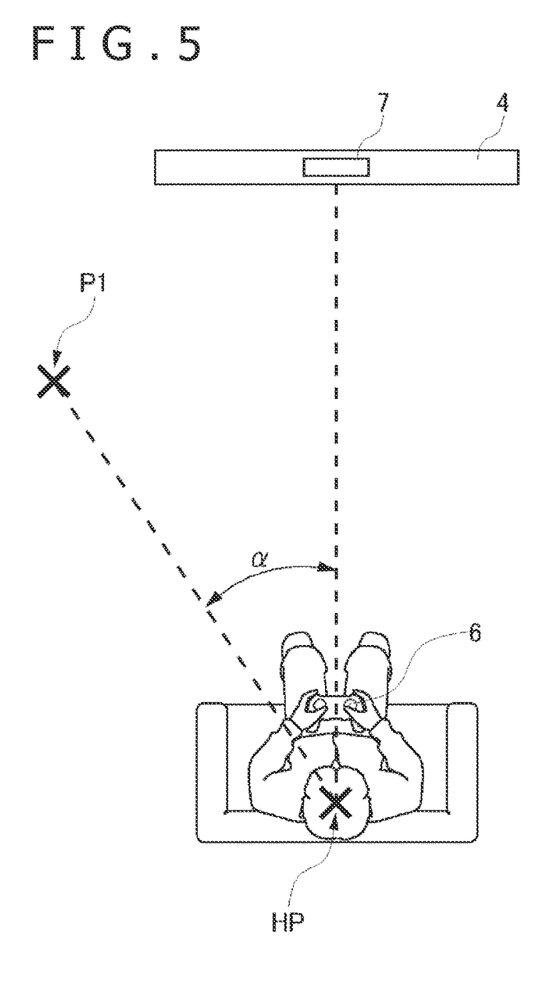
FIG. 5 is a diagram illustrating the localization position for the sound image of a game sound.

FIG. 5 illustrates the localization position P1 for the sound image of the game sound. The game sound localization processing section 106 identifies the head position HP of the user in the three-dimensional space and the orientation of the user's face. The game sound localization processing section 106 may identify the head position HP of the user and the orientation of the user's face from an image captured by the camera 7. In the example of FIG. 5, the user is playing a game while facing a direction opposite the display apparatus 4 (a forward direction), and the game sound localization processing section 106 determines the localization position P1 for the sound image of the game sound, based on the head position HP and forward direction of the user. Here, the angle formed between the forward direction with respect to the head position HP and a straight line joining the head position HP and the localization position P1 is set to a, and the distance in a real space between the head position HP and the localization position P1 is set based on the distance L in the game space. In this manner, the game sound localization processing section 106 converts a sound source position in the game space to the localization position P1 for a sound image in the three-dimensional space.

The game sound localization processing section 106 subjects the game sound data supplied from the game execution section 102 to a sound image localization process for localizing a sound image at the determined localization position P1. The sound image localization process is a process that is performed by using a surround technology to let the user perceive that a sound is emitted from the localization position P1. The game sound localization processing section 106 performs the sound image localization process of adjusting the game sound output of the speakers 3 and generates localized game sound data. When localizing the sound image at the localization position P1 by using the virtual surround technology, the game sound localization processing section 106 generates the localized game sound data by performing the sound image localization process through the use of a head-related transfer function corresponding, for example, to the direction of the sound image. The game sound output section 108 supplies the localized game sound data to each of the speakers 3 through the mixing section 92. This enables the user to hear the explosion sound emitted from the localization position P1.

The agent execution section 202 causes the speakers 3 to output the voice of the agent by executing an agent program for communication with the user. The agent execution section 202 is able to understand a user's utterance and make an audible response.

Figure 6:
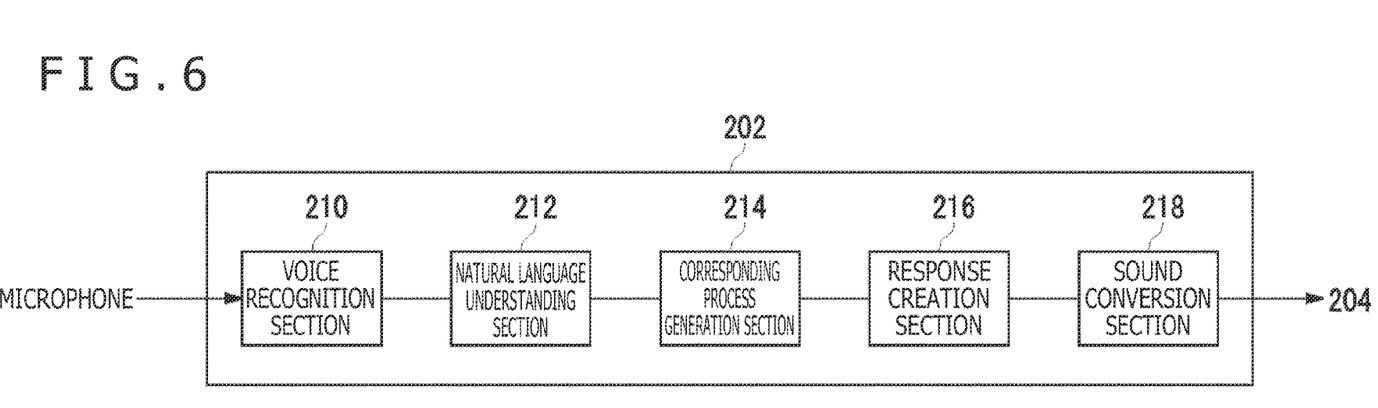
FIG. 6 is a diagram illustrating an example of a configuration of an agent execution section.

FIG. 6 illustrates an example of a configuration of the agent execution section 202. The agent execution section 202 includes a voice recognition section 210, a natural language understanding section 212, a corresponding process generation section 214, a response creation section 216, and a sound conversion section 218.

The voice recognition section 210 voice-recognizes a user's utterance inputted from a microphone (not depicted) and converts the user's utterance to text. The natural language understanding section 212 understands a user's intention from the text. The corresponding process generation section 214 generates an internal command corresponding to the user's intention. The response creation section 216 creates a response message to the user in text format. The sound conversion section 218 converts the created message to an agent's voice and outputs the agent's voice to the agent sound localization processing section 204.

If, for example, a voice saying "What does the weather look like tomorrow?" is uttered by the user, the natural language understanding section 212 understands a user's request to know the next day's weather from the text generated by the voice recognition section 210. The corresponding process generation section 214 transmits a command inquiring the next day's weather to an external server. The response creation section 216 receives, from the external server, information indicating that the weather is supposed to be fine next day and creates a text of a response message saying "It is supposed to be fine tomorrow." The sound conversion section 218 generates agent sound data for reproducing an agent's voice saying "It is supposed to be fine tomorrow," and outputs the agent sound data to the agent sound localization processing section 204.

The agent sound localization processing section 204 determines a position in the three-dimensional space at which the sound image of an agent sound is to be localized. More specifically, the agent sound localization processing section 204 localizes the sound image of the agent sound at a localization position P2 that is different from the localization position P1 at which the sound image of the game sound is localized. As the localization position P2 for the sound image of the agent sound, the agent sound localization processing section 204 may determine a position in the three-dimensional space at which the sound image of the game sound will possibly be not localized. If, for example, a parameter is set for the game to indicate areas where a sound may be generated in the game space and areas where no sound is generated, the agent sound localization processing section 204 may acquire the parameters from the game to identify the areas where no game sound is generated. For example, in a case where no other object exists in the overhead space of the game character, a parameter is set for the game to indicate that the overhead space of the game character is an area where no game sound is generated. The agent sound localization processing section 204 may acquire the parameter to determine that the sound image of the game sound will possibly be not localized in the overhead space of the user, and set the localization position P2 for the sound image of the agent sound at a position in the overhead space of the user.

The agent sound localization processing section 204 performs the sound image localization process of localizing the sound image at the determined localization position P2 on the agent sound data supplied from the agent execution section 202. The agent sound localization processing section 204 performs the sound image localization process of adjusting the agent sound output of the speakers 3 and generates the localized agent sound data. When localizing the sound image at the localization position P2 by using the virtual surround technology, the agent sound localization processing section 204 performs the sound image localization process by using a head-related transfer function corresponding, for example, to the direction of the sound image, and generates the localized agent sound data. The game sound localization processing section 106 and the agent sound localization processing section 204 may be provided as separate localization processing sections. Alternatively, a single localization processing section may be shared to process both the game sound and the agent sound. The agent sound output section 206 supplies the localized agent sound data to each of the speakers 3 through the mixing section 92. This enables the user to hear the agent sound emitted from the localization position P2 and recognize the existence of a virtual agent.

While hearing the game sound generated at the localization position P1, the user hears the agent sound generated at the localization position P2, which is different from the localization position P1. This enables the user to clearly distinguish between the game sound and the agent sound when hearing them. It is preferable that the direction from the head position HP of the user to the localization position P1 be different from the direction from the head position HP to the localization position P2. As far as the head position HP, the localization position P1, and the localization position P2 are not arranged on a straight line, the user is able to clearly distinguish between the game sound and the agent sound when hearing them.

Figure 7:
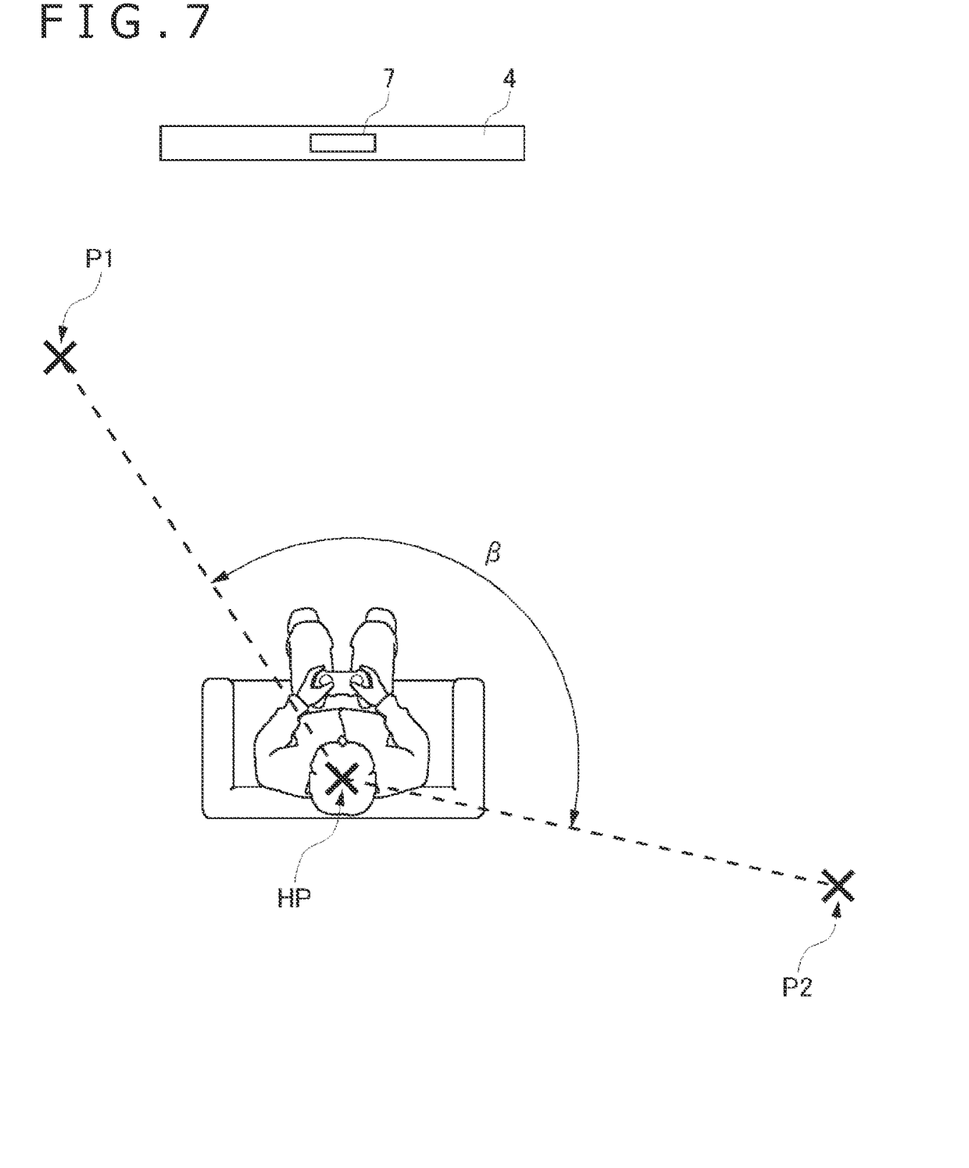
FIG. 7 is a diagram illustrating the localization position for the sound image of an agent sound.

FIG. 7 illustrates the localization position P2 for the sound image of the agent sound. In the present embodiment, the agent sound localization processing section 204 acquires, from the game sound localization processing section 106, localization information for identifying the localization position P1 for the sound image of the game sound and sets the localization position P2 for the agent sound to a position different from the localization position P1 for the game sound.

The localization information may indicate the relative position of the sound image of the game sound with respect to the user in the three-dimensional space or the coordinate values of the localization position P1 for the game sound in the three-dimensional space. The agent sound localization processing section 204 should preferably determine the localization position P2 in such a manner that the angle β between the direction from the head position HP of the user to the localization position P1 and the direction from the head position HP of the user to the localization position P2 is equal to or larger than a predetermined angle γ. The predetermined angle γ is only required to be an angle at which the direction of a sound source can be identified and may, for example, be 90 degrees.

When the localization position P2 is set to a high position above the head of the user, the user is given a sense as if the agent is viewing the user from above. Further, when the localization position P2 is set to a shoulder of the user, the user is given a sense as if the agent is constantly staying close to the user at the shoulder of the user. Moreover, when the localization position P2 is set to a predetermined position in front of the display apparatus 4, the user is given a sense as if the agent is constantly facing the user. Furthermore, when the agent shaped like a drone or other flying object appears above the head of the game character in a case where the localization position P2 is set to a low position above the head of the user, the user is given a sense as if the agent is constantly rotating above the head of the user. The agent sound localization processing section 204 may constantly set the localization position P2 to a predetermined position as far as the direction of the localization position P2 does not coincide with that of the localization position P1. When the direction of the localization position P2 coincides with that of the localization position P1, the agent sound localization processing section 204 may change the localization position P2 in such a manner that the direction of the localization position P2 is displaced from that of the localization position P1.

In a case where the agent appears as a moving body during the game, the agent may not only rotate constantly above the head of the game character but also move freely around the user depending on the progress of the game and act like a character in the game. The game execution section 102 grasps the position information regarding the sound generation source. Therefore, the localization position P2 may be made different from the localization position P1 by disposing the agent at a position different from the position of the sound generation source.

In the first embodiment, the agent sound localization processing section 204 acquires, from the game sound localization processing section 106, the localization information for identifying the localization position P1. However, the localization information for identifying the localization position P1 may be acquired through a different route. Sound image localization is achieved by controlling the output volume of each of the speakers 3 and the time lag between the outputs of the speakers 3. Therefore, the agent sound localization processing section 204 may analyze and acquire the localization position P1 for the sound image of the game sound by monitoring the output volume of each of the speakers 3 and the time lag between the outputs of the speakers 3.

For example, in a case where two speakers 3 are used as left and right speakers to provide a virtual multi-channel sound space based on a virtual surround sound, the agent sound localization processing section 204 calculates the angle of the localization position P1 with respect to the user from the volume ratio between the left and right speakers 3. This enables the agent sound localization processing section 204 to grasp the localization position P1 and determine the localization position P2 so that the angle β between the direction from the head position HP of the user to the localization position P1 and the direction from the head position HP of the user to the localization position P2 is equal to or larger than the predetermined angle γ.

Incidentally, the characteristics of human ears are such that a low-pitched sound is heard from a low location while a high-pitched sound is heard from a high location. Therefore, the agent sound localization processing section 204 may localize the sound image of the agent sound in such a manner that the agent sound is heard from a height different from the height from which the game sound is heard. For example, in a case where the game sound contains many high frequencies, the agent sound localization processing section 204 may generate a low-frequency agent sound and set the localization position P2 at a low location. Conversely, in a case where the game sound contains many low frequencies, the agent sound localization processing section 204 may generate a high-frequency agent sound and set the localization position P2 at a high location.

The agent sound localization processing section 204 may move the localization position P2 for the agent sound in association with the movement of the localization position P1 for the game sound. The agent sound localization processing section 204 may allow the user to recognize a voice from the agent by confining the movement of the localization position P2 within a predetermined range.

In the first embodiment, it is assumed that only one agent exists. Alternatively, a plurality of agents may exist. Even in a case where the plurality of agents exist, the agent sound localization processing section 204 should preferably perform setup in such a manner that the localization positions for the sound images of individual agent sounds exist in different directions with respect to the user.

Figure 8:
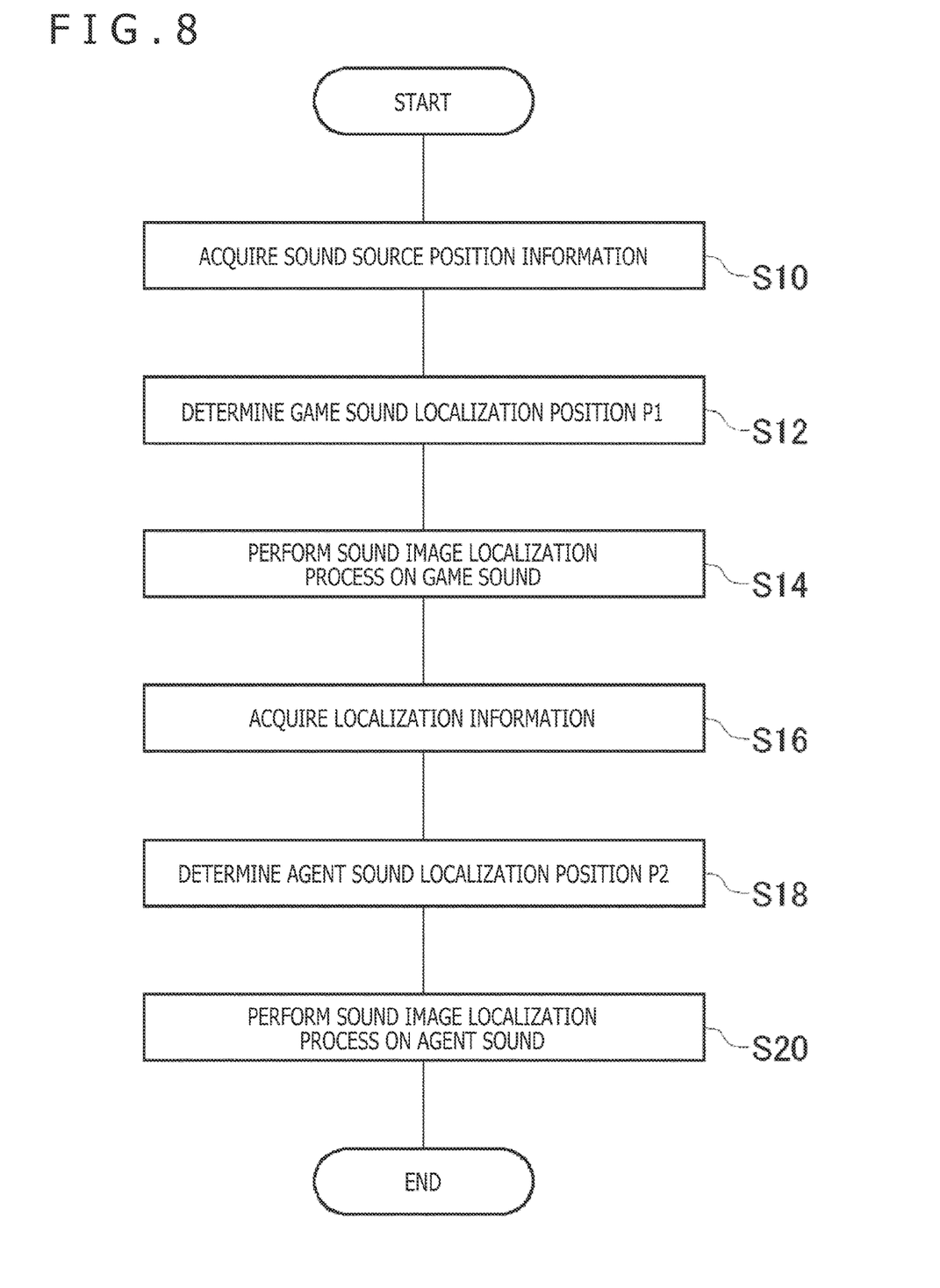
FIG. 8 is a diagram illustrating a flowchart for a sound image localization process performed on an agent sound.

FIG. 8 is a flowchart illustrating the sound image localization process performed on an agent sound. The game execution section 102 generates the game sound data to be generated from the sound generation source in the game space and supplies the generated game sound data and the sound source position information to the game sound localization processing section 106. The game sound localization processing section 106 acquires the game sound data and the sound source position information (step S10), calculates the relative direction and distance of the sound generation source with respect to the game character from the sound source position information, and determines the localization position P1 in the three-dimensional space at which the sound image of the game sound is to be localized (step S12).

The game sound localization processing section 106 subjects the game sound data supplied from the game execution section 102 to the sound image localization process for localizing the sound image at the determined localization position P1 (step S14). The game sound localization processing section 106 performs the sound image localization process of adjusting the game sound output of the speakers 3 and generates localized game sound data. When localizing the sound image at the localization position P1 by using the virtual surround technology, the game sound localization processing section 106 generates the localized game sound data by performing the sound image localization process through the use of a head-related transfer function corresponding, for example, to the direction of the sound image.

The agent sound localization processing section 204 acquires, from the game sound localization processing section 106, the localization information for identifying the localization position P1 for the sound image of the game sound (step S16). The localization information may indicate the relative position of the sound image of the game sound with respect to the user in the three-dimensional space or the coordinate values of the localization position P1 for the game sound in the three-dimensional space. The agent sound localization processing section 204 determines the localization position P2 for the agent sound in such a manner that the determined localization position P2 is different from the localization position P1 (step S18). The agent sound localization processing section 204 subjects the agent sound data supplied from the agent execution section 202 to the sound image localization process for localizing the sound image at the determined localization position P2 (step S20).

Figure 9:
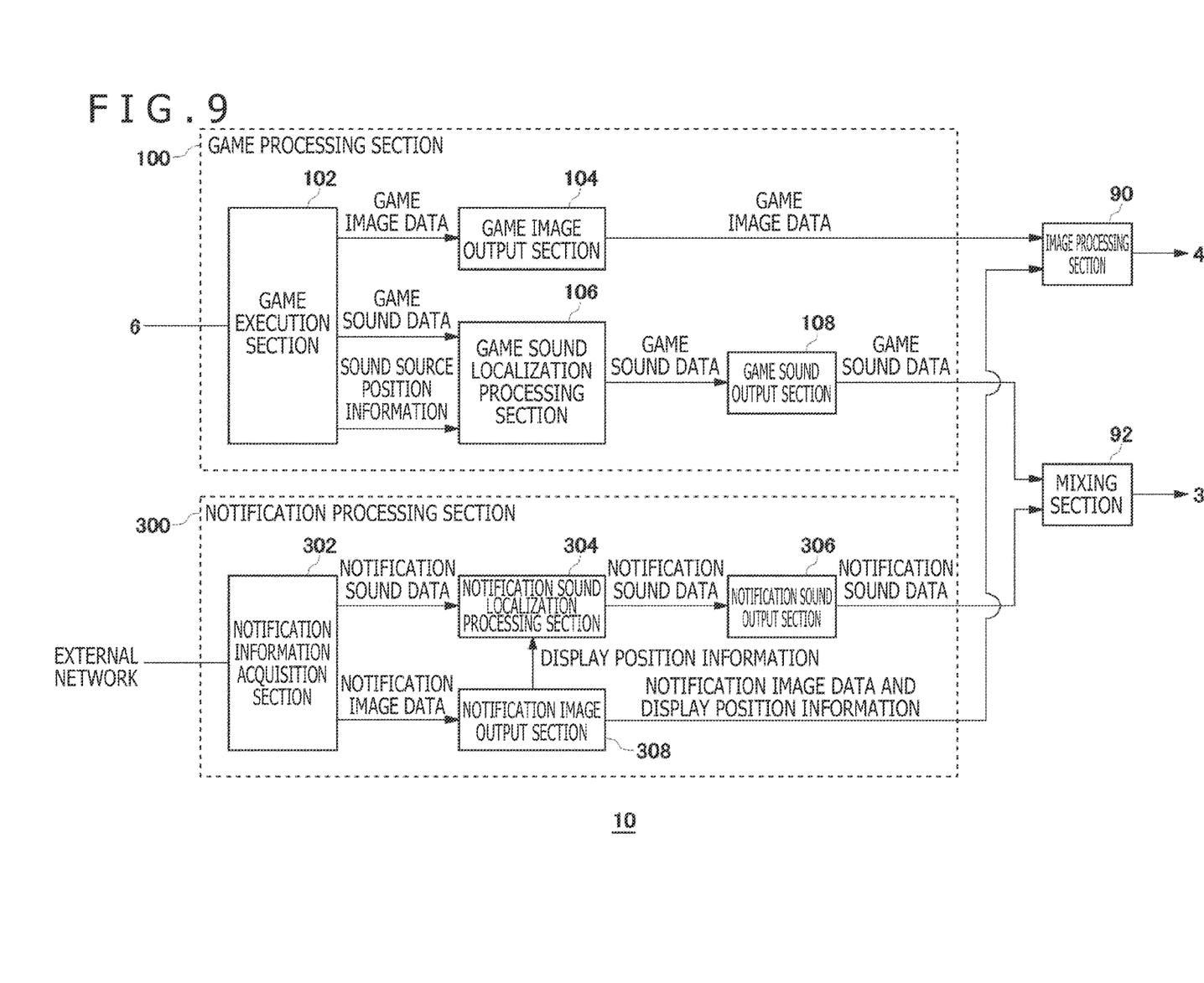
FIG. 9 is a diagram illustrating the functional blocks of the information processing apparatus according to a second embodiment.

FIG. 9 illustrates the functional blocks of the information processing apparatus 10 according to a second embodiment. In the second embodiment, the information processing apparatus 10 executes a notification processing function of supplying, to the user, notification information generated by the system software in the information processing apparatus 10 or the external server.

The information processing apparatus 10 includes the game processing section 100, a notification processing section 300, the image processing section 90, and the mixing section 92. The game processing section 100 includes the game execution section 102, the game image output section 104, the game sound localization processing section 106, and the game sound output section 108. The notification processing section 300 includes a notification information acquisition section 302, a notification sound localization processing section 304, a notification sound output section 306, and a notification image output section 308. The game processing section 100 in the second embodiment has the same configuration and functions as the game processing section 100 in the first embodiment, which is depicted in FIG. 3.

Referring to FIG. 9, individual elements depicted as the functional blocks for performing various processes may be implemented by hardware such as a circuit block, a memory, or other LSI, or by software such as the system software or the game program loaded into the memory. Therefore, it will be understood by those skilled in the art that the functional blocks may variously be implemented by hardware only, by software only, or by a combination of hardware and software. The method of implementing the functional blocks is not specifically limited.

The notification information acquisition section 302 acquires internal notification information generated by the system software in the information processing apparatus 10 and/or external notification information generated by the external server. For example, when a friend A of the user logs into the gaming apparatus, the external server transmits notification information to the user to indicate that "Friend A is online." When the notification information acquisition section 302 acquires such notification information while the user is playing a game, the notification information acquisition section 302 generates notification sound data and notification image data and supplies them to the notification sound localization processing section 304 and the notification image output section 308, respectively. The notification image output section 308 causes a part of the display area of the display apparatus 4 to display the notification image data. The notification image output section 308 supplies the notification image data and information (display position information) for identifying a notification image display position to the image processing section 90.

Figure 10:
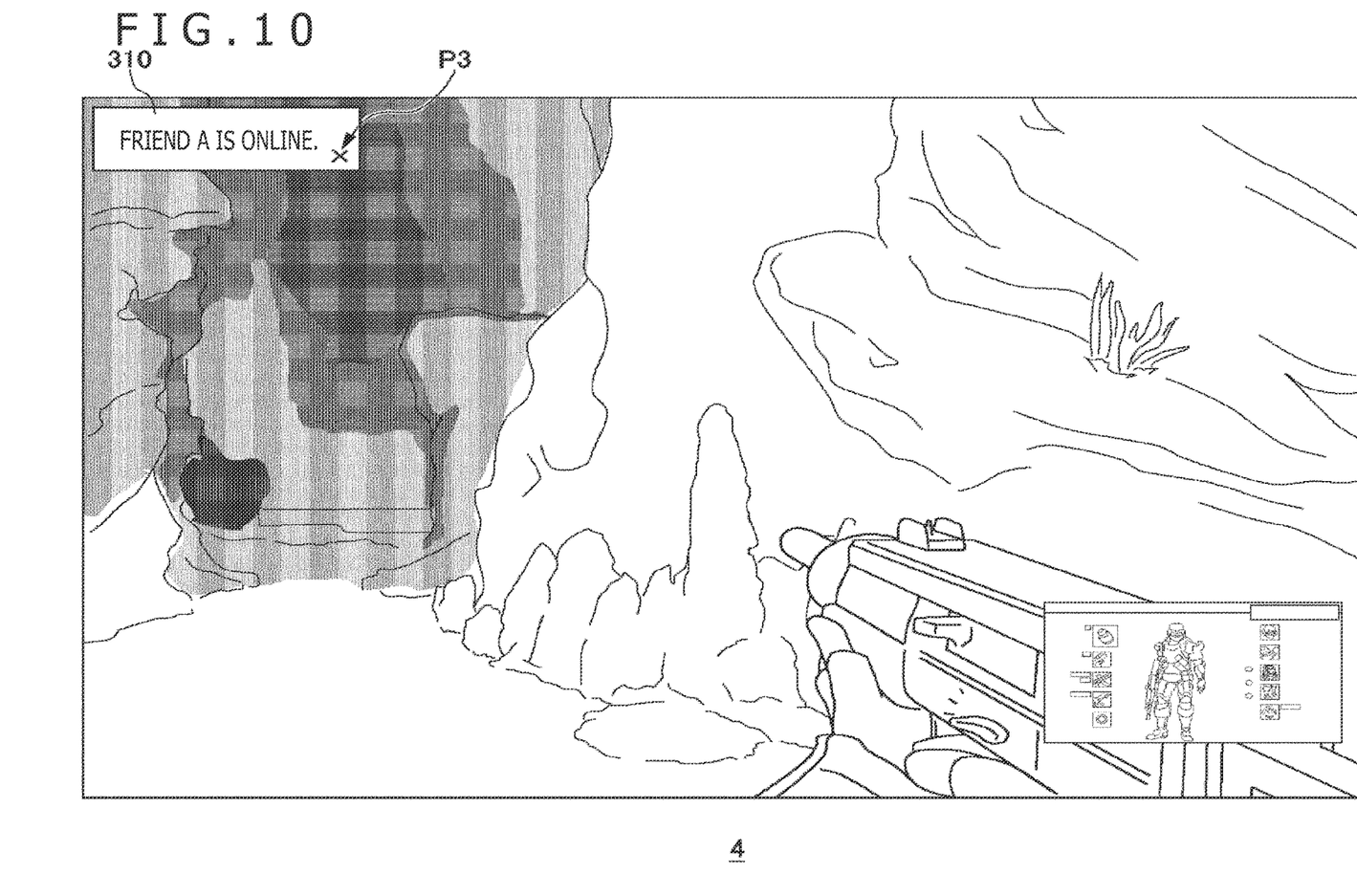
FIG. 10 is a diagram illustrating an example of a game image.

FIG. 10 illustrates an example of the game image to be displayed on the display apparatus 4. The image processing section 90 receives the game image data supplied from the game image output section 104 and receives the notification image data supplied from the notification image output section 308. The image processing section 90 generates display data from the game image data, generates data to be superimposed and displayed at a position designated by the display position information from the notification image data, and displays the generated data in the display area of the display apparatus 4. The position at which an image is to be superimposed and displayed is often set in the vicinity of an edge of a screen, to avoid interfering with the progress of the game. FIG. 10 depicts a notification image 310 that is superimposed and displayed in the upper left corner of the game image.

When the notification image 310 is displayed in the upper left corner, it does not interfere with the progress of the game. However, the notification image 310 displayed in such a manner may be out of view of the user, causing the user to overlook a notification message. In view of such circumstances, the notification sound localization processing section 304 acquires the display position information from the notification image output section 308 and sets a localization position P3 for the sound image of a notification sound to a position within a part of the display area of the display apparatus 4, that is, at a position or its vicinity where the notification image 310 is to be displayed. In this instance, the notification sound localization processing section 304 may determine the display position of the notification image 310 as the localization position P3 for the notification sound on condition that the display position of the notification image 310 differs from the localization position P1 for the sound image of the game sound.

The notification sound localization processing section 304 subjects the notification sound data supplied from the notification information acquisition section 302 to the sound image localization process for localizing the sound image at the determined localization position P3. The notification sound localization processing section 304 performs the sound image localization process to generate localized notification sound data. The game sound localization processing section 106 and the notification sound localization processing section 304 may be provided as separate localization processing sections. Alternatively, a single localization processing section may be shared to process both the game sound and the notification sound. The notification sound output section 306 supplies the localized notification sound data to each of the speakers 3 through the mixing section 92. This enables the user to hear the notification sound emitted from the localization position P3 and notice the displayed notification image 310 by viewing the direction from which the notification sound is emitted.

The present embodiment has been described on the assumption that the display apparatus 4 is a TV set. Alternatively, the display apparatus 4 may be a head-mounted display (HMD). When the notification image 310 is displayed in a corner of the screen of a conventional HMD, the user may overlook the displayed notification image 310. Therefore, the notification image 310 is displayed in the center of the game image in order to let the user notice the notification image 310. However, such a display position may result in interfering with the sense of immersion into the game.

The HMD is mounted on the head of the user. The information processing apparatus 10 determines the gaze direction of a virtual camera in the game space according to a value detected by a posture sensor on the HMD and supplies the game image to the HMD. When the game is played by using the HMD in the above manner, the game image in the game space can be changed simply by allowing the user to change his/her gaze. Consequently, in a case where the notification sound is emitted from the upper left of the screen while the notification image 310 is displayed in the upper left corner of the screen as depicted in FIG. 10, the user wearing the HMD on his/her head and facing the upper left direction is able to promptly view the notification image 310 without allowing the notification image 310 to interfere with the game image.

According to the above description, the display position information supplied to the image processing section 90 from the notification image output section 308 indicates that the notification image is to be displayed in the upper left corner of the game image. Alternatively, the display position information may designate a display position according to the localization position P1 for the sound image of the game sound. The notification image output section 308 may acquire the localization information identifying the localization position P1 for the sound image of the game sound from the game sound localization processing section 106, and set the notification image display position to a position different from the localization position P1 for the game sound. As far as the display position of the notification image 310 is different from the localization position P1 for the game sound, the localization position P1 and the localization position P3 are set to different positions when the notification sound localization processing section 304 sets the localization position P3 for the notification sound as the notification image display position.

The present invention has been described in terms of embodiments. The embodiments are illustrative and not restrictive. Persons skilled in the art will understand that the combination of the elements and processes of the embodiments may variously be modified and further, that such modifications are also within the scope of the present invention. The embodiments have been described by citing the sound of a game executed by the game execution section 102, as an example of a content sound generated by content. Alternatively, the content sound may be a sound generated by a video that is reproduced, for example, by a video reproduction application. Further, the embodiments have been described on the assumption that the game execution section 102 executes the FPS game. Alternatively, the game execution section 102 may execute a different type of game.

The agent sound localization processing section 204 and the notification sound localization processing section 304 may dynamically set the localization positions P2 and P3 in such a manner that the user is provided with a sense as if the sound supplied to the user is gradually approaching the user from a distant place. The agent sound localization processing section 204 may express the personality and character of the agent by dynamically setting the localization position P2. For example, the localization position P2 may be moved hastily to express the personality and character of an impatient agent. The notification sound localization processing section 304 may dynamically set the localization position P3 according, for example, to the importance of the notification message.

REFERENCE SIGNS LIST

1 . . . Information processing system, 3 . . . Speaker, 4 . . . Display apparatus, 10 . . . Information processing apparatus, 90 . . . Image processing section, 92 . . . Mixing section, 100 . . . Game processing section, 102 . . . Game execution section, 104 . . . image output section, 106 . . . Game sound localization processing section, 108 . . . Game sound output section, 200 . . . Agent processing section, 202 . . . Agent execution section, 204 . . . Agent sound localization processing section, 206 . . . Agent sound output section, 210 . . . Voice recognition section, 212 . . . Natural language understanding section, 214 . . . Corresponding process generation section, 216 . . . Response creation section, 218 . . . Sound conversion section, 300 . . . Notification processing section, 302 . . . Notification information acquisition section, 304 . . . Notification sound localization processing section, 306 . . . Notification sound output section, 308 . . . Notification image output section

INDUSTRIAL APPLICABILITY

The present invention is applicable to a technology for localizing a sound image in a space.

The invention claimed is:

1. An information processing apparatus that is to be connected to a plurality of speakers directed toward a user in a physical space, the information processing apparatus comprising:
   a first localization processing section that localizes a sound image of a sound of content, where the sound of content is taken from virtual reality, including a virtual space that is produced by way of a computer system;
   a first sound output section that supplies, to the speakers, sound data of the content subjected to localization such that the sound image of the sound of content will be perceived by the user as emanating from a first localization position within the physical space;
   a second localization processing section that localizes a sound image of a sound different from the sound of content at a second localization position, the second localization position being different from the first localization position, where the sound different from the sound of content is also taken from the virtual reality; and
   a second sound output section that supplies, to the speakers, sound data of the sound different from the sound of content subjected to localization such that the sound image of sound different from the sound of content will be perceived by the user as emanating from the second localization position.

2. The information processing apparatus according to claim 1, wherein the second localization processing section acquires the first localization position.

3. The information processing apparatus according to claim 2, wherein the second localization processing section determines the second localization position in such a manner that an angle between a direction from a head position of a user to the first localization position and the direction from the head position of the user to the second localization position is equal to or larger than a predetermined angle.

4. The information processing apparatus according to claim 1, wherein
   the information processing apparatus is to be connected to a display apparatus,
   the information processing apparatus further includes a notification image output section that causes a part of a display area of the display apparatus to display notification image data to be supplied to the user, and
   the second localization processing section sets the second localization position to a position within a part of the display area of the display apparatus.

5. The information processing apparatus according to claim 4, further comprising:
   a content image output section that displays image data of the content in an entire display area of the display apparatus, wherein the notification image output section causes a part of the display area to display notification data in a superimposed manner.

6. The information processing apparatus according to claim 4, wherein the display apparatus includes a head-mounted display.

7. A sound generation method for causing audio from a plurality of speakers to be directed toward a user in a physical space, the method comprising:
- localizing a sound image of a sound of content, where the sound of content is taken from virtual reality, including a virtual space that is produced by way of a computer system;
- supplying, to the plurality of speakers, sound data of the content subjected to localization such that the sound image of the sound of content will be perceived by the user as emanating from a first localization position within the physical space;
- localizing a sound image of a sound different from the sound of content at a second localization position, the second localization position being different from the first localization position, where the sound different from the sound of content is also taken from the virtual reality; and
- supplying, to the speakers, sound data of the sound different from the sound of content subjected to localization such that the sound image of sound different from the sound of content will be perceived by the user as emanating from the second localization position.

8. A non-transitory, computer readable storage medium containing a computer program, which when executed by a computer, causes the computer to perform sound generation method for causing audio from a plurality of speakers to be directed toward a user in a physical space, by carrying out actions, comprising:
- localizing a sound image of a sound of content, where the sound of content is taken from virtual reality, including a virtual space that is produced by way of a computer system;
- supplying, to the plurality of speakers, sound data of the content subjected to localization such that the sound image of the sound of content will be perceived by the user as emanating from a first localization position within the physical space;
- localizing a sound image of a sound different from the sound of content at a second localization position, the second localization position being different from the first localization position, where the sound different from the sound of content is also taken from the virtual reality; and
- supplying, to the speakers, sound data of the sound different from the sound of content subjected to localization such that the sound image of sound different from the sound of content will be perceived by the user as emanating from the second localization position.

* * * * *